United States Patent
Chou et al.

(10) Patent No.: US 12,289,440 B2
(45) Date of Patent: Apr. 29, 2025

(54) VIDEO TRANSMISSION DELAY MEASUREMENT METHOD AND DEVICE THEREOF

(71) Applicant: Aurora Multimedia Corp, Morganville, NJ (US)

(72) Inventors: Hui-Ya Chou, Morganville, NJ (US); Yuan-Min Chuang, Morganville, NJ (US); Paul Harris, Morganville, NJ (US); Nicholas Paul Reiser, Morganville, NJ (US); Matthew Andrew Materniak, Morganville, NJ (US)

(73) Assignee: AURORA MULTIMEDIA CORP, Morganville, NJ (US)

( * ) Notice: Subject to any disclaimer, the term of this patent is extended or adjusted under 35 U.S.C. 154(b) by 0 days.

(21) Appl. No.: 18/623,481

(22) Filed: Apr. 1, 2024

(65) Prior Publication Data
US 2024/0422305 A1    Dec. 19, 2024

(30) Foreign Application Priority Data

Jun. 14, 2023   (TW) ................................. 112122187

(51) Int. Cl.
*H04N 17/04* (2006.01)
*H04L 65/80* (2022.01)
*H04N 17/00* (2006.01)

(52) U.S. Cl.
CPC ............. *H04N 17/04* (2013.01); *H04L 65/80* (2013.01)

(58) Field of Classification Search
CPC ........ H04N 17/00; H04N 17/04; H04N 17/02; H04N 17/004; H04N 17/045; H04L 65/80
USPC ........................................ 348/180, 181, 192
See application file for complete search history.

(56) References Cited

U.S. PATENT DOCUMENTS

2010/0333148 A1* 12/2010 Musha ............. H04N 21/23406
725/81

FOREIGN PATENT DOCUMENTS

| TW | 201345267 A | 11/2013 |
| TW | 201601525 A | 1/2016 |

\* cited by examiner

*Primary Examiner* — Sherrie Hsia
(74) *Attorney, Agent, or Firm* — RABIN & BERDO, P.C.

(57) ABSTRACT

Provided are a video transmission delay measurement method testing an under-test system having an under-test system input port and an under-test system output port and comprising the following steps: generating an original test video and outputting the original test video to the under-test system input port of the under-test system, wherein the original test video has a central time corresponding to a video generating time at which the original test video is generated; receiving a played test video from the under-test system output port of the under-test system, wherein the played test video corresponds to the original test video and the played test video has the central time corresponding to the video generating time at which the original test video is generated; obtaining the central time of the played test video; calculating a time difference between a current time and the central time of the under-test system.

9 Claims, 8 Drawing Sheets

VIDEO TRANSMISSION DELAY MEASUREMENT METHOD AND DEVICE THEREOF

CROSS-REFERENCE TO RELATED APPLICATIONS

This application claims the priority benefit of TW application serial No. 112122187 filed on Jun. 14, 2023. The entirety of the above-mentioned patent application is hereby incorporated by reference herein and made a part of the specification.

BACKGROUND OF THE INVENTION

1. Field of the Invention

The present invention relates to a delay time measurement method and a device thereof, and more particularly to a video transmission delay measurement method and device thereof.

2. Description of the Related Art

In the era of broadcasting videos by Audiovisual over Internet Protocol (AV over IP), namely, audiovisual (AV) signals are transmitted through Internet Protocol (IP) addresses. The quality of the transmitted videos is restricted by various hardware conditions. For example, under a hardware condition of an audiovisual environment, the network bandwidth is limited by the network equipment, limiting the frame rate by the image processing speed of hardware. For viewers of real-time videos, one of the most important quality considerations is whether there is a delay time during video playing. Regardless of whether the delay time is caused by different settings of different routers, or by equipment for compressing and decompressing audiovisual signals in the computer room, the viewers watching the video always regard that as the delay time caused by the computer room. This delay time may affect the mood of online viewers watching the live event, or cause engineers watching the live broadcast of precision machinery to misjudge the actual operation of precision machinery, causing a negative impact.

With reference to FIG. 8, however, the audiovisual computer room nowadays does not have an efficient delay estimation method. When the audiovisual computer room wants to check whether the internal equipment causes the obvious delay time, the audiovisual computer room needs to calculate the delay time through visual inspection manually. For example, transmit a video with a counter through a distributor into the original AV over IP system and transmit the video to a video equipment through the AV over IP system. Compare an original video 101 played on a computer room device 100 with a played video 201 played on a viewer audiovisual device 200 by taking photos. The original video 101 contains a time number 102, and when the same time number 102 appears in the played video 201 on the viewer audiovisual device 200, the audiovisual computer room determines that the original video 101 played on the computer room device 100 and the played video 201 played on the viewer audiovisual device 200 display the same picture. Moreover, when the computer room device 100 starts to play the original video 101 with the time number 102, start counting at a first time 103 manually. When the played video 201 played on the viewer audiovisual device 200 displays the same picture as the original video 101, stop counting at a second time 104. The delay time is estimated based on the difference between the visually measured second time 104 and the visually measured first time 103.

For example, in FIG. 8, when a personnel notices that the time number 102 played on the computer room device 100 and a played time number 202 of the viewer audiovisual device 200 are both 0:02:05.06, the personnel uses a timer 300 to time sequentially to obtain the second time 104 and the first time 103. The personal calculates the difference between the second time 104 and the first time 103 as 2.43 seconds, so the estimated delay time is 2.43 seconds.

The existing delay time estimation method not only consumes manpower but is also inefficient. In addition, the accuracy of estimation is also affected by human judgment, so the estimation technology of delay time needs to be improved.

SUMMARY OF THE INVENTION

An objective of the present invention is to provide a video transmission delay measurement method and device thereof to instantly and accurately assess whether the under-tested hardware system in a broadcasting computer room has significant delay time. Moreover, the present invention does not need to rely on visual inspection to manually calculate the delay time, so the present invention can also save the required manpower of the delay time estimation.

The video transmission delay measurement method is performed by a video transmission delay measurement device having an input port and an out port to test an under-test system having an under-test system input port and an under-test system output port. The video transmission delay measurement method includes the following steps:

generating an original test video and outputting the original test video to the under-test system input port of the under-test system; wherein the original test video has a central time corresponding to a video generating time at which the original test video is generated;

receiving a played test video from the under-test system output port of the under-test system; wherein the played test video corresponds to the original test video and the played test video has the central time corresponding to the video generating time at which the original test video is generated;

obtaining the central time of the played test video;

calculating a time difference between a current time and the central time.

The video transmission delay measurement device is provided to test an under-test system having an under-test system input port and an under-test system output port. The video transmission delay measurement device includes a shell, a monitor, an output port, an input port, and a processor.

The monitor is arranged on the shell. The output port is arranged on the shell and electrically connected to the under-test system input port of the under-test system.

The input port is arranged on the shell and electrically connected to the under-test system output port of the under-test system.

The processor is electrically connected to the monitor, the output port, and the input port, and executes:

generating an original test video and outputting the original test video to the under-test system input port of the under-test system; wherein the original test video has a central time corresponding to a video generating time at which the original test video is generated;

receiving a played test video from the under-test system output port of the under-test system; wherein the played test video corresponds to the original test video and has the central time corresponding to the video generating time at which the original test video is generated;

obtaining the central time of the played test video;

calculating a time difference between a current time and the central time of the under-test system.

The user of the present invention can carry the video transmission delay measurement device, which executes the video transmission delay measurement method. By simply electrically connecting the output port to the under-test system input port of the under-test system, and electrically connecting the input port to the under-test system output port of the under-test system, the video transmission delay measurement device automatically estimates whether the under-test system produces an obvious delay time when processing the original test video into the played test video outputted by the under-test system, and improves the accuracy of delay time estimation to the level of microseconds. The present invention can automatically display the estimation results on the monitor to help the user to accurately understand the delay time caused by the under-test system in real time.

DETAILED DESCRIPTION OF THE INVENTION

The present invention provides a video transmission delay measurement method and device thereof.

Figure 1:
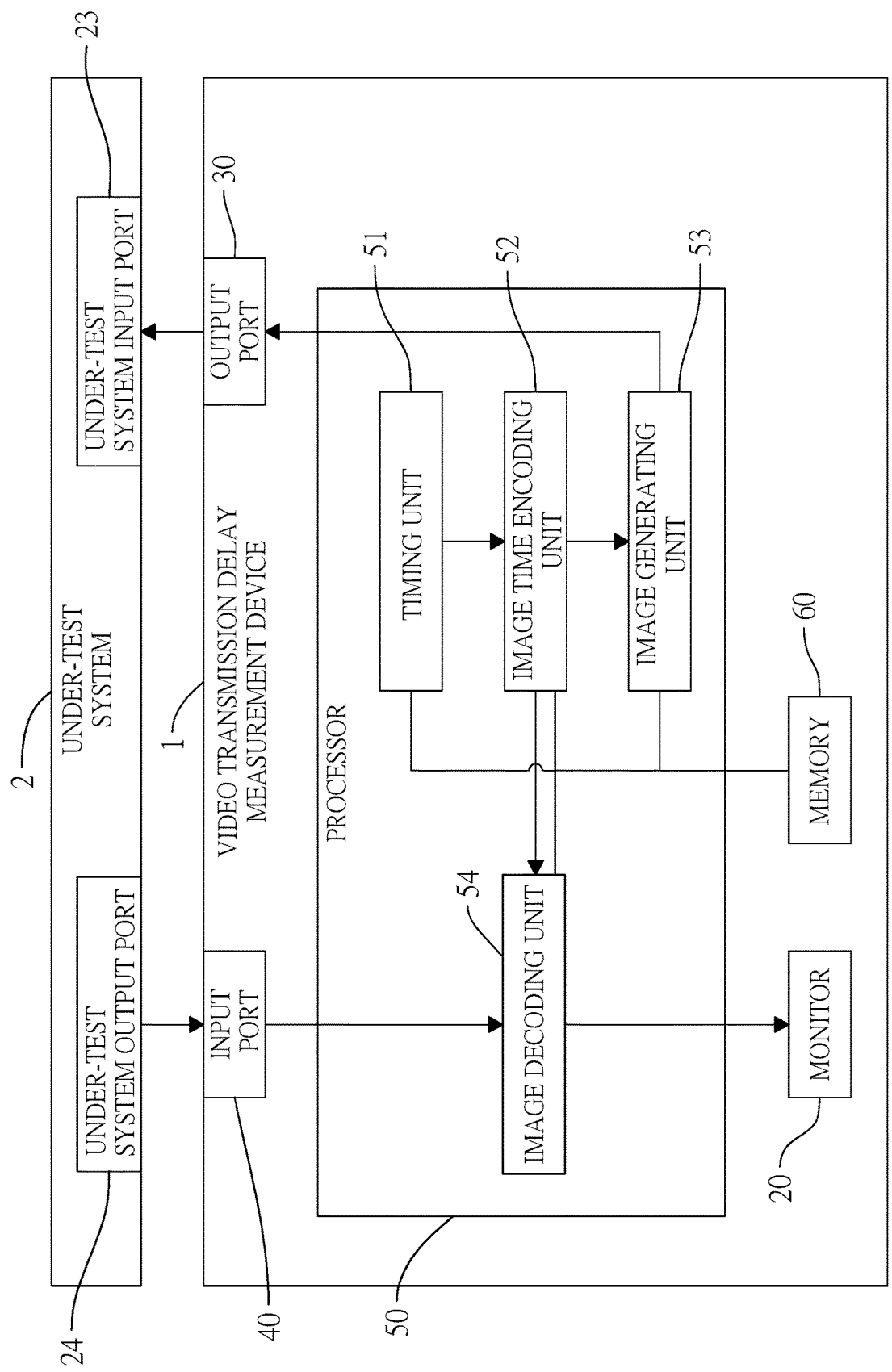
FIG. 1 is a block diagram of a video transmission delay measurement device.
Figure 2:
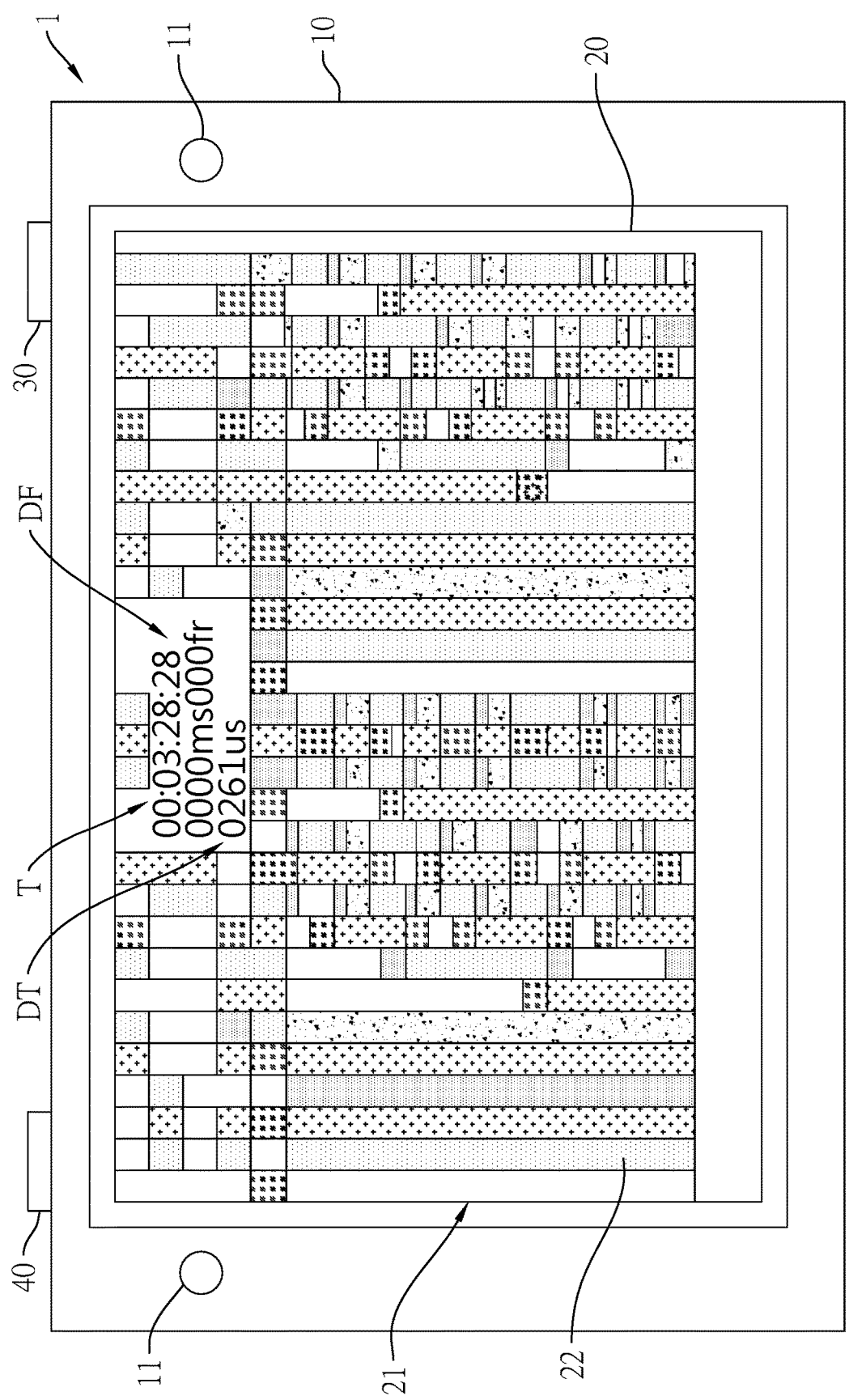
FIG. 2 is a schematic diagram of the monitor of the video transmission delay measurement device showing a result screen.

With reference to FIG. 1 and FIG. 2, a video transmission delay measurement device 1 of the present invention includes a shell 10, a monitor 20, an output port 30, an input port 40, and a processor 50. Moreover, in an embodiment of the present invention, the video transmission delay measurement device 1 also includes a memory 60. The processor 50 is electrically connected to the monitor 20, the output port 30, the input port 40, and the memory 60 respectively. The monitor 20, the output port 30, and the input port 40 are respectively arranged on the shell 10. The processor 50 and the memory 60 are respectively arranged inside the shell 10.

The output port 30 and input port 40 of the video transmission delay measurement device 1 of the present invention are electrically connected to an under-test system 2. The under-test system 2 is an Audiovisual over Internet Protocol (AV over IP) system that can transmit, for example, an audiovisual (AV) signal through an Internet Protocol (IP) address. The under-test system 2 includes an under-test system input port 23 and an under-test system output port 24. The under-test system input port 23 is electrically connected to the output port 30 of the video transmission delay measurement device 1, and the under-test system output port 24 is electrically connected to the input port 40 of the video transmission delay measurement device 1.

Further, the processor 50 of the video transmission delay measurement device 1 includes a timing unit 51, an image time encoding unit 52, an image generating unit 53 and an image decoding unit 54. The timing unit 51, the image time encoding unit 52, the image generating unit 53 and the image decoding unit 54 are electrically connected to the memory 60 respectively. The image time encoding unit 52 is electrically connected to the timing unit 51, the image generating unit 53 and the image decoding unit 54. The image generating unit 53 is electrically connected to the output port 30. The image decoding unit 54 is electrically connected to the input port 40 and the monitor 20.

Figure 3:
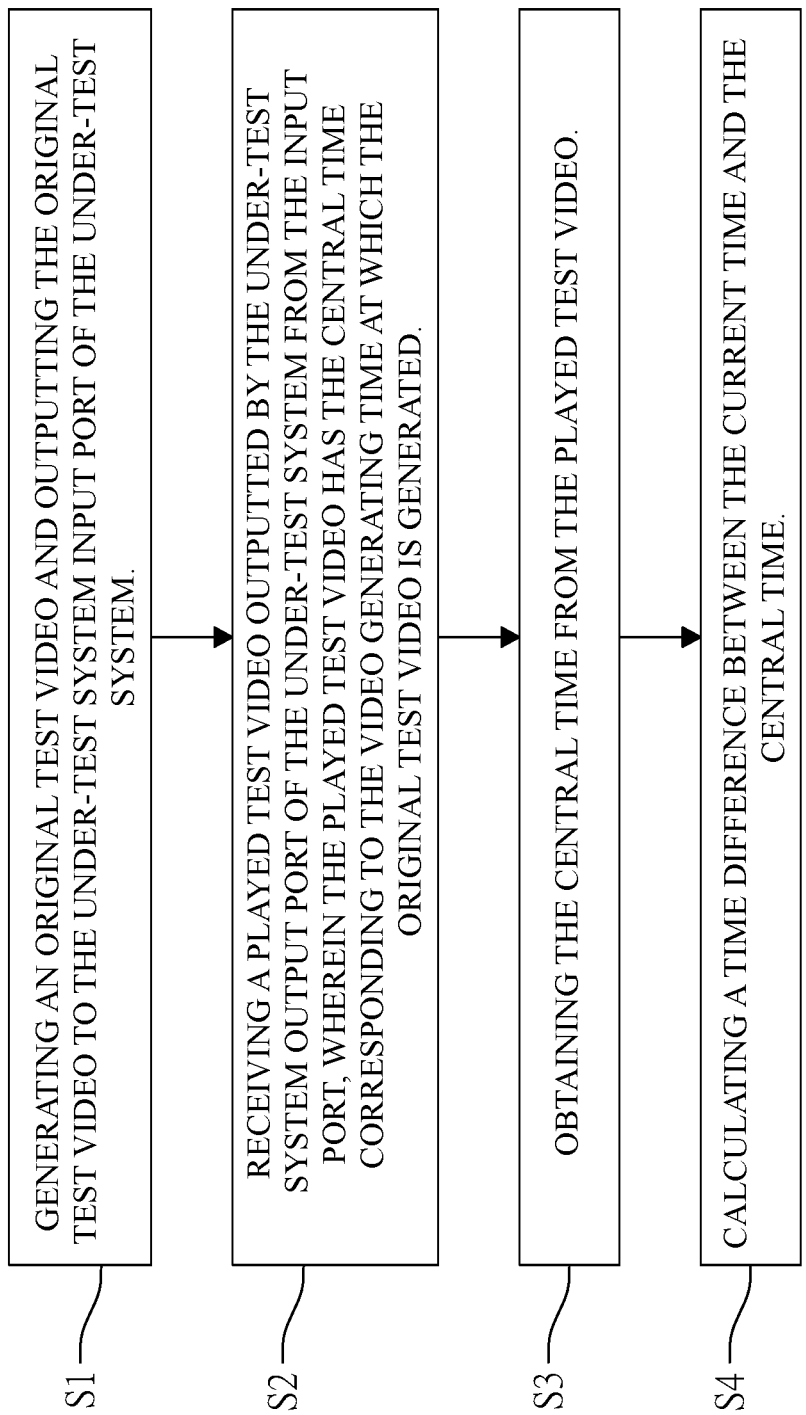
FIG. 3 is a flow chart of the video transmission delay measurement device executing a video transmission delay measurement method.
Figure 4:
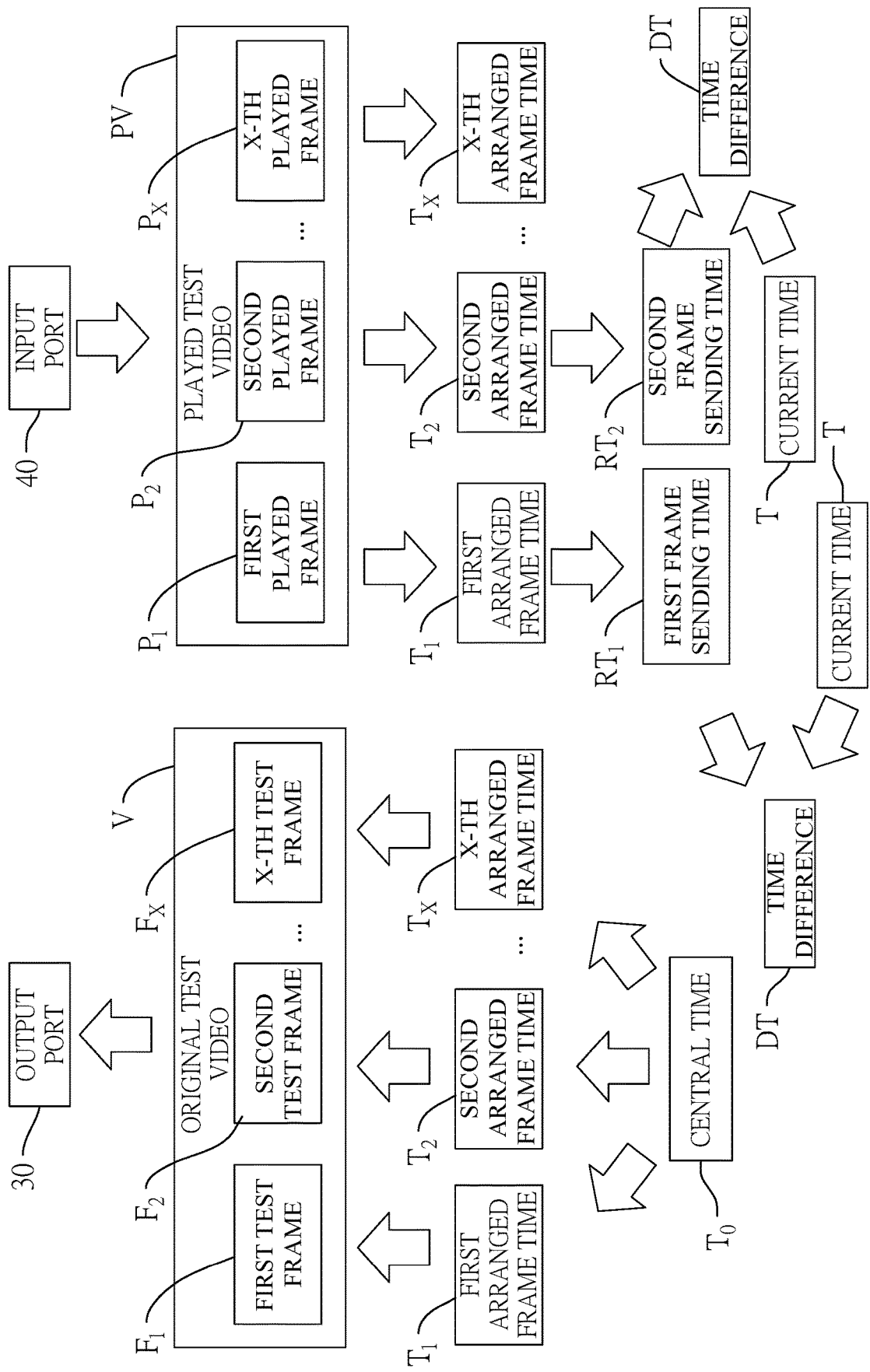
FIG. 4 is a first flow chart of the video transmission delay measurement method.

With reference to FIG. 3 and FIG. 4, the memory 60 stores a frame generating frequency. The timing unit 51 has a current time T, and the current time T is continuously updated according to a National Standard Time (NST). When the present invention begins to execute the video transmission delay measurement method by the processor 50, the timing unit 51 of the processor 50 takes the current time T of this moment as a central time $T_0$, and the processor 50 executes the following steps:

Step S1: The image time encoding unit 52 and the image generating unit 53 generate an original test video V and output the original test video V to the under-test system input port 23 of the under-test system 2 through the output port 30. The original test video V has the central time $T_0$ corresponding to a video generating time at which the original test video V is generated.

Specifically, the original test video V includes a plurality of test frames. For example, the test frames include a first test frame $F_1$, a second test frame $F_2$ . . . to an X-th test frame $F_X$. The X is a positive integer greater than two. The central time $T_0$ corresponding to a frame generating time at which the first test frame $F_1$ is generated is a first arranged frame time $T_1$, the central time $T_0$ corresponding to the frame generating time at which the second test frame $F_2$ is generated is a second arranged frame time $T_2$, and so on, the central time $T_0$ corresponding to the frame generating time at which the X-th test frame $F_X$ is generated is an X-th arranged frame time $T_X$. Moreover, each test frame also includes a plurality of test pixels, and the test pixels of each test frame are encoded with the central time $T_0$ corresponding to each test frame. For example, each test pixel in the first test frame $F_1$ is encoded with the first arranged frame time $T_1$, and so on.

Step S2: receiving a played test video PV outputted by the under-test system output port 24 of the under-test system 2 from the input port 40. The played test video PV has the central time $T_0$ corresponding to the video generating time at which the original test video V is generated. Specifically, the played test video PV includes a plurality of played frames. For example, the played frames include a first played frame $P_1$, a second played frame $P_2$ . . . to an X-th played frame $P_X$. The played test video PV corresponds to the original test video V, so the played test video PV has the central time $T_0$ corresponding to the video generating time at which the original test video PV is generated. The played frames of the played test video PV have the central time $T_0$ corresponding to the frame generating time at which the test frames are generated. For example, the first played frame $P_1$ has the first arranged frame time $T_1$ corresponding to the first test frame $F_1$, the second played frame $P_2$ has the second arranged frame time $T_2$ corresponding to the second test frame $F_2$, and so on. This is because the original test video V is processed by the under-test system 2, and the played test video PV is a video processed by the under-test system 2 according to the original test video V. The played test video PV is the video outputted after reprocessing by the under-test system 2. Therefore, the content of the first played frame $P_1$ to the X-th played frame $P_X$ includes the content of the first test frame $F_1$ to the X-th test frame $F_X$.

Step S3: obtaining the central time $T_0$ from the played test video PV. Specifically, the image decoding unit 54 decodes and reads the central time $T_0$ of the most immediately received played frame in the played test video PV received from the input port 40. For example, the image decoding unit 54 decodes and reads the first arranged frame time $T_1$ from the first played frame $P_1$ into a first frame sending time $RT_1$, or the image decoding unit 54 decodes and reads the second arranged frame time $T_2$ from the second played frame $P_2$ into a second frame sending time $RT_2$.

Step S4: the image decoding unit 54 calculates a time difference DT between the current time T and the central time $T_0$. Preferably, the present invention can further determine whether the under-test system 2 delays processing the original test video V to the played test video PV based on the time difference DT, and the processor 50 controls the monitor 20 to display the result of the determination. For example, the monitor 20 is controlled by the processor 50 to display a result screen 21 as shown in FIG. 2. The result screen 21 presents the current time T and the time difference DT calculated by the processor 50. As shown in FIG. 2, in this example, the time difference DT calculated by the device 1 of the present invention is a delay time of 0000 milliseconds (ms) and 0261 microseconds (us). That is to say, the under-test system 2 takes 0261 microseconds to process the original test video V to the played test video PV outputted by the under-test system 2, causing the 0261 microseconds delay time of the under-test system 2.

The user of the present invention can carry the video transmission delay measurement device 1, which executes the video transmission delay measurement method. By simply electrically connecting the output port 30 to the under-test system input port 23 of the under-test system 2, and electrically connecting the input port 40 to the under-test system output port 24 of the under-test system 2, the video transmission delay measurement device 1 automatically estimates whether the under-test system 2 produces an obvious delay time when processing the original test video V into the played test video PV outputted by the under-test system 2, and improves the accuracy for estimating the time difference DT to the scale of microseconds. The present invention can automatically display the result screen 21 on the monitor 20 to help the user to accurately understand the delay time caused by the under-test system 2 in real time.

Figure 5:
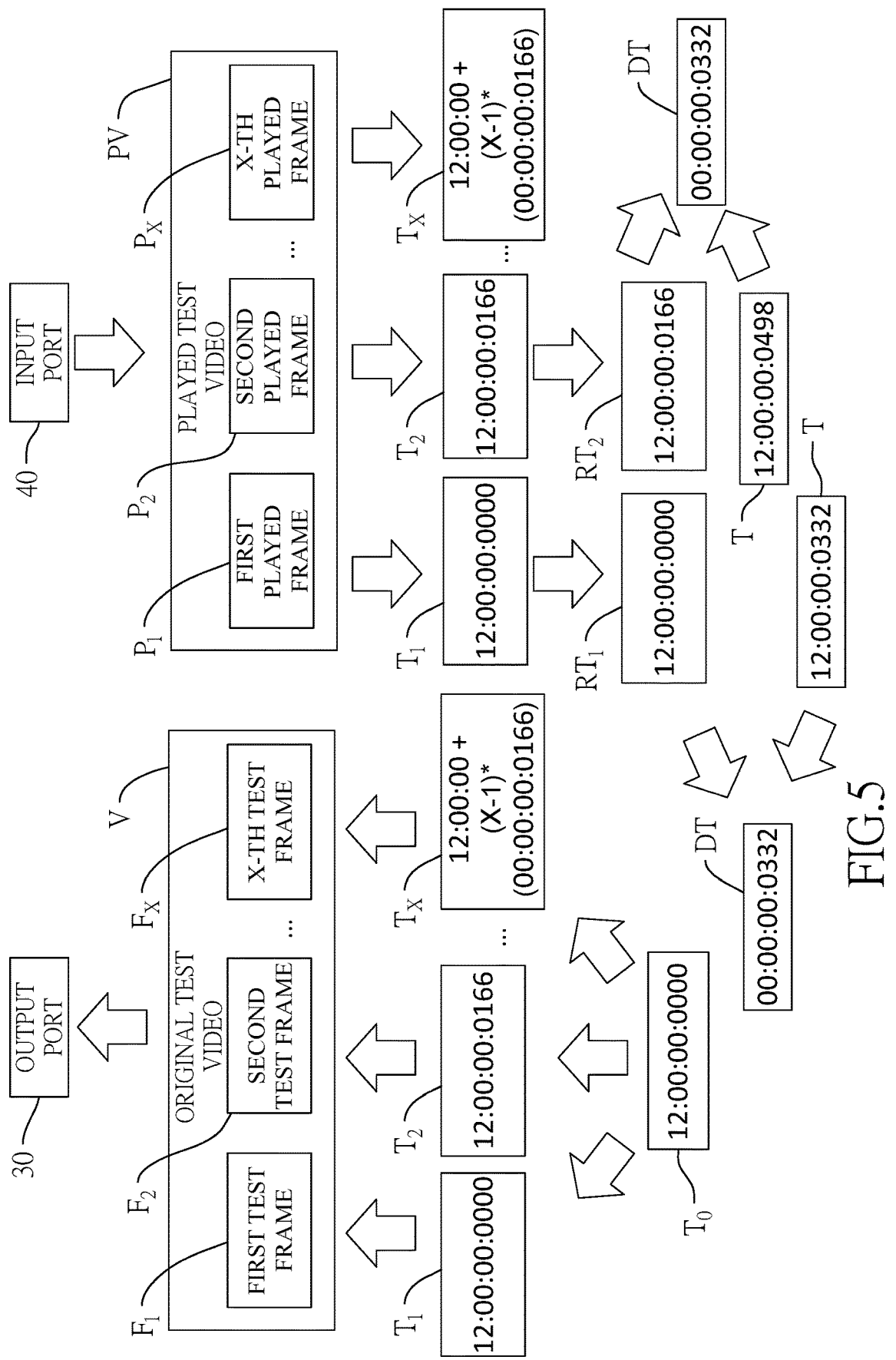
FIG. 5 is a second flow chart of the video transmission delay measurement method.

With reference to FIG. 4 and FIG. 5, although the device 1 of the present invention can improve the accuracy for estimating the time difference DT to the level of microseconds, for conciseness of explanation, this example uses a longer time as an example. In this example, the timing unit 51 sequentially generates the first arranged frame time $T_1$ as 12 hours:00 minutes:00 seconds:000.0 milliseconds, the second arranged frame time $T_2$ as 12 hours–: 00 minutes–:00 seconds–:016.6 milliseconds, and the X-th arranged frame time $T_X$ is adding 12 hours:00 minutes:00 seconds to (X–1)*(16.6 milliseconds). The X is a positive integer greater than two. The difference of 16.6 milliseconds between the first arranged frame time $T_1$ and the second arranged frame time $T_2$ is generated because the memory 60 stores the 60 Hz frame generating frequency. The reciprocal of 60 Hz is 16.6 milliseconds. That is, the frame generating frequency is a frequency for generating 60 test frames per second. There is an interval of about 16.6 milliseconds between two continuously generated test frames, that is, the generation time of one frame is about 16.6 milliseconds.

Further, in this example, the first frame sending time $RT_1$ decoded and read by the image decoding unit 54 from the first played frame $P_1$ is 12 hours 00 minutes:00 seconds: 000.0 milliseconds. The second frame sending time $RT_2$ decoded by the image decoding unit 54 from the second played frame $P_2$ is 12 hours: 00 minutes:00 seconds:016.6 milliseconds. The X-th frame sending time $RT_X$ decoded by the image decoding unit 54 from the X-th played frame $P_X$ is adding 12 hours:00 minutes:00 seconds to (X–1)*(16.6 milliseconds).

The current time T will continually change according to the processor 50 playing and checking the played test video PV. When the image decoding unit 54 uses the first frame sending time $RT_1$ and the current time T to calculate the time difference DT, the current time T will be 12 hours:00 minutes:00 seconds:033.2 milliseconds. Therefore, subtracting 12 hours:00 minutes:00 seconds:000.0 milliseconds from 12 hours:00 minutes:00 seconds:033.2 milliseconds will obtain the time difference DT of 33.2 milliseconds. When the image decoding unit 54 uses the second frame sending time $RT_2$ and the current time T to calculate the time difference DT, the current time T will become 12 hours:00 minutes:00 seconds: 049.8 milliseconds as time increases. Subtracting 12 hours:00 minutes:00 seconds: 016.6 milliseconds from 12 hours:00 minutes:00 seconds:049.8 milliseconds will also obtain the time difference DT of 33.2 milliseconds.

Figure 6:
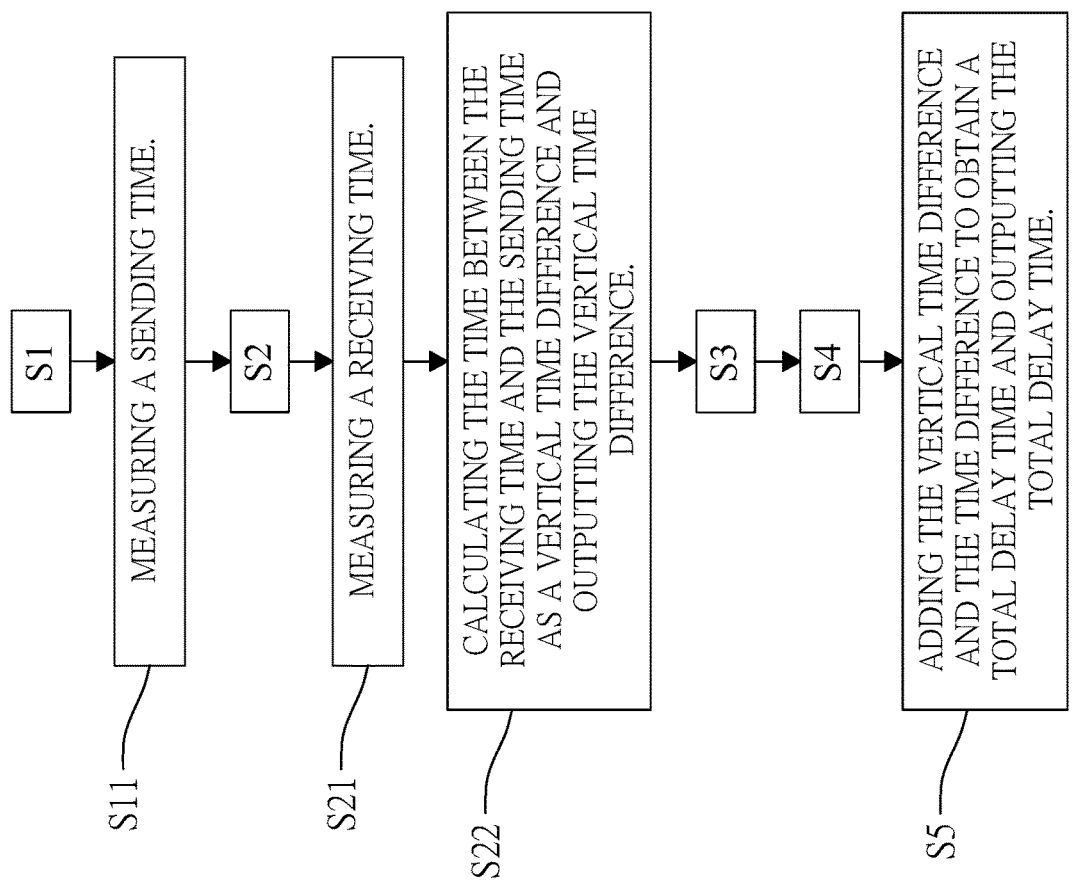
FIG. 6 is a third flow chart of the video transmission delay measurement method.

With reference to FIG. 6, in this embodiment, the test pixels of each test frame are constructed in the form of a plurality of pixel strips. Each test frame is formed by the pixel strips, and the pixel strips include a first output pixel strip first outputted by the processor 50. In addition, the played test video PV received by the processor 50 through the input port 40 includes a first input pixel strip first received by the processor 50.

When the processor 50 executes step S1 and outputs the first output pixel strip of the original test video V through the output port 30, the processor 50 executes the following steps:

Step S11: measuring a sending time through the timing unit 51.

When the processor 50 executes step S2 and receives the played test video PV through the input port 40, the processor 50 executes the following steps:

Step S21: measuring a receiving time through the timing unit 51.

Step S22: calculating the time between the receiving time and the sending time as a vertical time difference and outputting the vertical time difference. Preferably, the processor 50 controls the monitor 20 to display the vertical time difference.

When the processor 50 executes step S3 and step S4 to calculate the time difference DT, the processor 50 executes the following steps:

Step S5: adding the vertical time difference and the time difference DT to obtain a total delay time and outputting the total delay time. Preferably, the result screen 21 of the monitor 20 not only displays the time difference DT, but also displays the vertical time difference and the total delay time.

Through the time difference DT and the total delay time, an audio and video transmission performance of the under-test system 2 can be understood. The time difference DT and the total delay time can be used as a basis for improving the under-test system 2.

Figure 7:
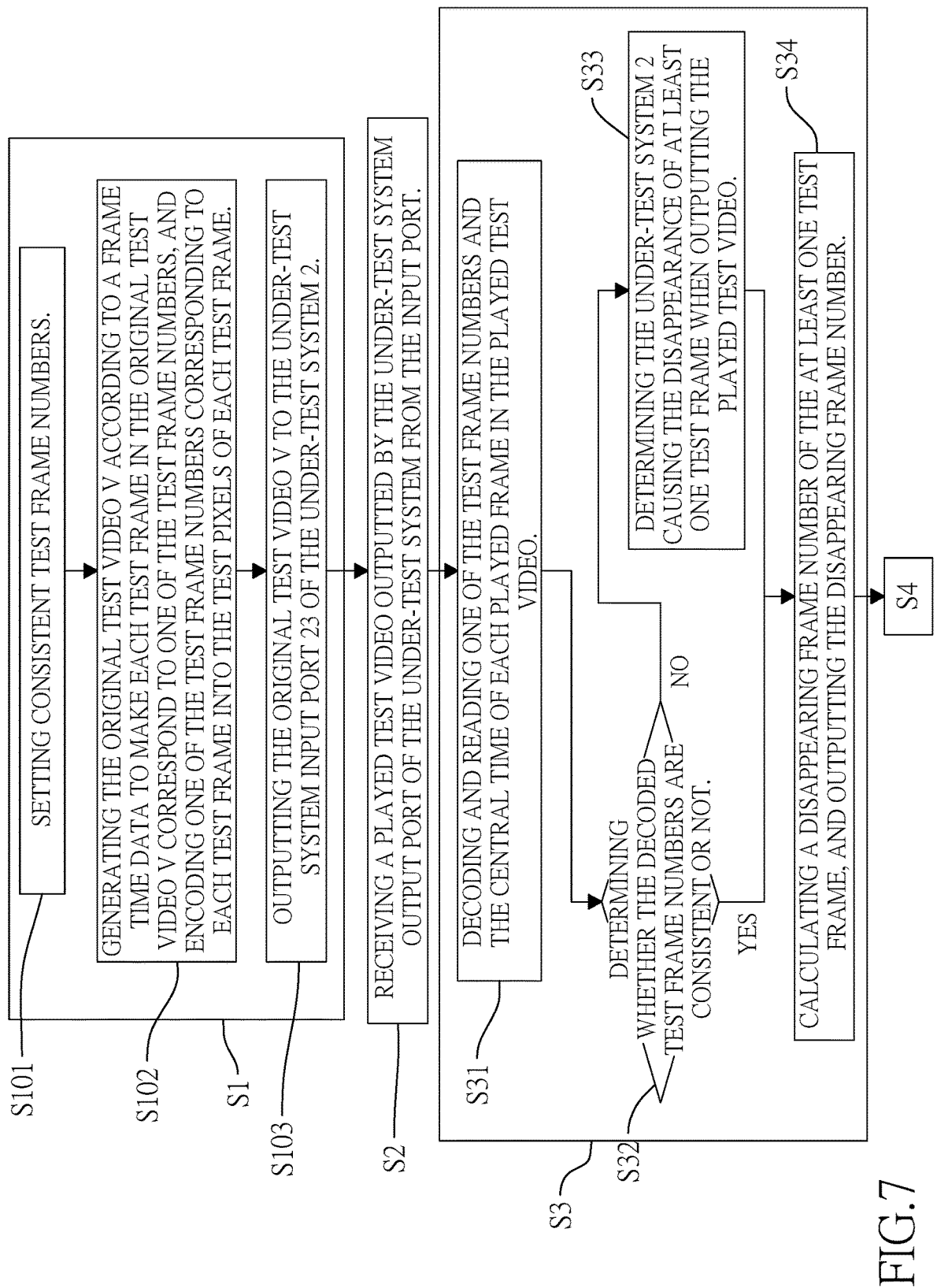
FIG. 7 is a fourth flow chart of the video transmission delay measurement method.
Figure 8:
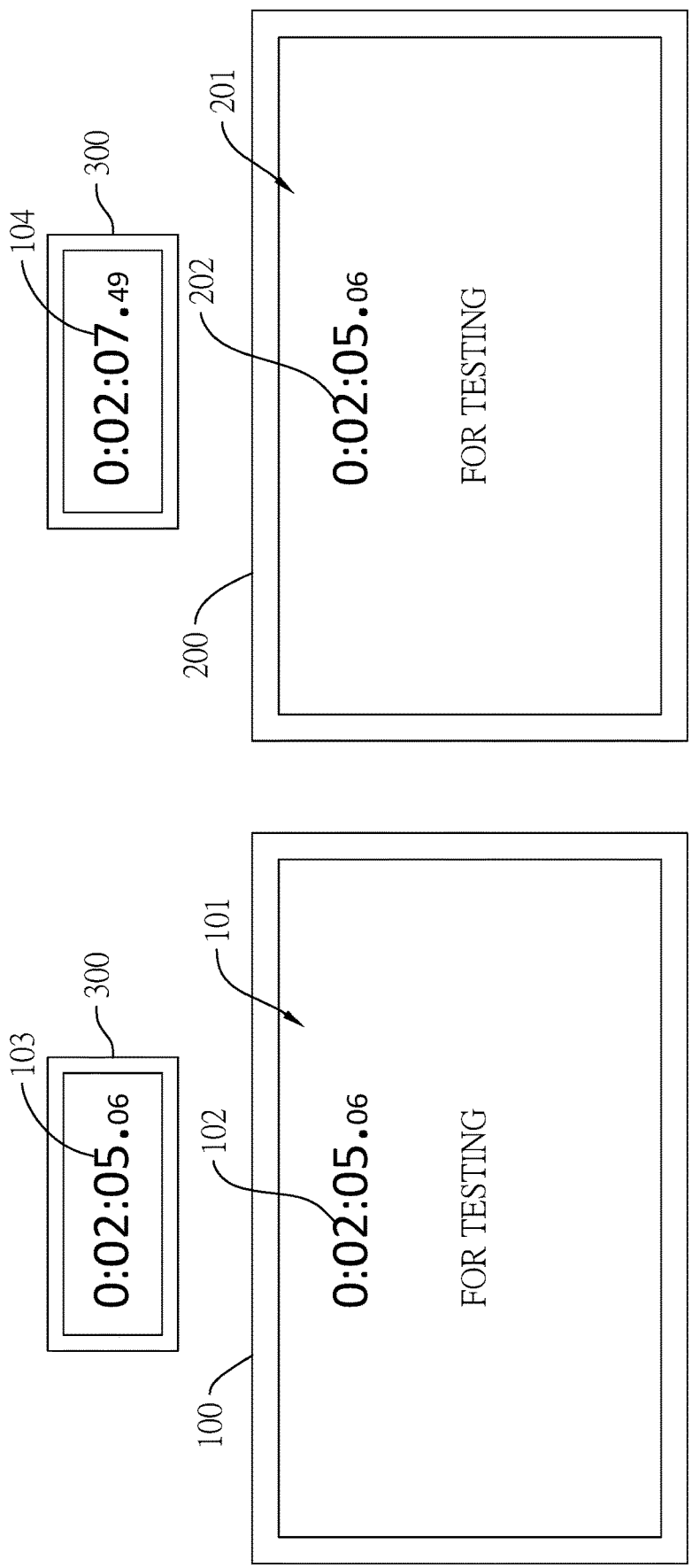
FIG. 8 is a schematic diagram of a conventional method for visually calculating delay time.

With reference to FIG. 2 and FIG. 7, in another embodiment, step S1 further includes the following sub-steps:

Step S101: Setting consistent test frame numbers, such as number 1, number 2 . . . to number X.

Step S102: generating the original test video V according to a frame time data to make each test frame in the original test video V correspond to one of the test frame numbers, and encoding one of the test frame numbers corresponding to each test frame into the test pixels of each test frame. For example, the first test frame $F_1$ corresponds to the number 1, the second test frame $F_2$ corresponds to the number 2, and the X-th test frame $F_X$ corresponds to the number X.

Step S103: outputting the original test video V to the under-test system input port 23 of the under-test system 2.

In this way, in the played test video PV received by the video transmission delay measurement device 1 from the input port 40, the played frames also have the test frame numbers, that is, the first played frame $P_1$ corresponds to Number 1, the second played frame $P_2$ corresponds to the number 2, and the Xth played frame $P_X$ corresponds to the number X.

Step S3 further includes the following sub-steps:

Step S31: decoding and reading one of the test frame numbers and the central time $T_0$ of each played frame in the played test video PV.

Step S32: determining whether the decoded test frame numbers are consistent or not. When determining the decoded test frame numbers are consistent, start to execute a step S34.

Step S33: When determining the decoded test frame numbers are inconsistent, it is determined that the under-test system 2 causes the disappearance of at least one test frame when outputting the played test video PV. For example, the processor 50 determines that the decoded test frame numbers include the number 1 corresponding to the first played frame $P_1$ and the number 2 corresponding to the second played frame $P_2$. However, when the number 3 corresponding to a third played frame $P_3$ is skipped and the number 4 corresponding to a fourth played frame $P_4$ is directly showed, it is determined that the under-test system 2 causes the third played frame $P_3$ to disappear when outputting the played test video PV, making the played frames inconsistent.

Step S34: calculating a disappearing frame number DF of the at least one test frame, and outputting the disappearing frame number DF. The disappearing frame number DF is a number of the played frames that have disappeared. After calculating and outputting the disappearing frame number DF, start to execute the step S4. Preferably, the outputted disappearing frame number DF is displayed on the result screen 21. Taking FIG. 2 for example, the result screen 21 displayed by the monitor 20 shows that the disappearing frame number DF is zero, that is, the process 50 determines that the decoded and read test frame numbers are consistent.

In this embodiment, one of the arranged frame time encoded in the corresponding test frames is encoded into each test pixel of one of the test frames in the form of a byte. The byte represents a pixel value of each test pixel of one of the test frames in the form of 8 bits. The pixel value represented by the byte is interpreted as a one-bit information, which means the byte of each pixel value is considered to have a one-bit value. More than two-thirds of the pixel values of one of the test frames are interpreted as the same one-bit information, which means more than two-thirds of the pixel values are considered to have the same one-bit value.

For example, when the processor 50 encodes the first arranged frame time $T_1$ into each test pixel of the first test frame $F_1$ by binary encoding, the pixel value of each test pixel is represented as an 8-bit binary code. The 8-bit binary code can be interpreted as the number of $2^8$. When encoding the color depth, 256 types of numbers are used to represent 256 color types. When encoding to generate the one-bit information with the one-bit value of 1, the processor 50 encodes an 8 bits code corresponding to a value greater than 192 in each test pixel of the first test frame $F_1$. In this way, the 8 bits code is represented as a region code corresponding to the first test frame $F_1$. When encoding to generate the one-bit information with a one-bit value of 0, the processor 50 encodes an 8 bits code corresponding to a digital information less than 64 in each test pixel of the first test frame $F_1$.

When more than two-thirds of the pixel values of the first played frame $P_1$ corresponding to the first test frame $F_1$ are greater than 128, that is, more than two-thirds of the pixel values in the region code are greater than 128, the pixel values of the first played frame $P_1$ are interpreted as having the same one-bit value of 1. When more than two-thirds of the pixel values of the first played frame $P_1$ corresponding to the first test frame $F_1$ are less than 64, that is, more than two-thirds of the pixel values in the region code are less than 64, the pixel values of the first played frame $P_1$ are interpreted as having the same one-bit value of 0. In this way, even a binary code 11000000 representing 192 missing any one bit, it can still be interpreted as a binary code representing a number more than 128. Even a binary code 1000000 representing 64 missing any one bit, it can still be interpreted as a binary code representing a number less than 64.

Such coding method can make the present invention less affected by information loss. The under-test system 2 outputs the played test video PV by processing the original test video V. When the played test video PV output by the under-test system 2 is distorted, the present invention can still revert the distorted content of the played test video PV to accurately calculate the total delay time.

The original test video V outputted to the under-test system 2 contains a stress testing image 22. The original test video V with a larger file size performs a stress test through the stress testing image 22 to determine whether the under-test system 2 delays processing the original test video V into the played test video PV. In the example of FIG. 2, the result screen 21 displayed by the monitor 20 presents the stress testing image 22, allowing the user to know what kind of the stress testing image 22 is used in the original test video V to test the under-test system 2.

In another embodiment, the housing 10 further includes a plurality of buttons 11, and the buttons 11 are electrically connected to the processor 50. The button 11 can be operated by the user to control various settings of the video transmission delay measurement device 1 of the present invention. For example, one of the buttons 11 is operated by the user to generate a setting signal to the processor 50, making the processor 50 adjust one of the settings stored in the memory 60 according to the setting signal.

What is claimed is:

1. A video transmission delay measurement method, performed by a video transmission delay measurement device having an input port and an out port to test an under-test system having an under-test system input port and an under-test system output port, comprising the following steps:
  a. generating an original test video and outputting the original test video to the under-test system input port of the under-test system; wherein the original test video has a central time corresponding to a video generating time at which the original test video is generated;
  b. receiving a played test video from the under-test system output port of the under-test system; wherein the played test video has the central time corresponding to the video generating time at which the original test video is generated;
  c. obtaining the central time of the played test video; and
  d. calculating a time difference between a current time and the central time of the under-test system.

2. The video transmission delay measurement method as claimed in claim 1, wherein the original test video includes at least one test frame, and the at least one test frame has the central time corresponding to a frame generating time at which the at least one test frame is generated;
  wherein each test frame includes a plurality of test pixels, and the central time of the at least one test frame is encoded into the test pixels of each test frame;
  wherein the played test video includes at least one played frame, and the at least one played frame has the central time corresponding to the frame generating time at which the at least one played frame is generated;
  wherein the step c is to decode the central time in the at least one played frame of the played test video.

3. The video transmission delay measurement method as claimed in claim 2, wherein the at least one test frame is a plurality of test frames, the at least one played frame is a plurality of played frames, and the measurement method further comprises the following sub-steps:
  setting consistent test frame numbers of the test frames; and
  making each test frame correspond to one of the test frame numbers, and encoding one of the test frame numbers corresponding to each test frame into the test pixels of each test frame;
  wherein, the played frames of the played test video also have the test frame numbers;
  wherein, when receiving the played test video outputted by the under-test system, the measurement method further includes the following sub-steps:
    decoding one of the test frame numbers of each played frame in the played test video;
    determining whether the decoded test frame numbers are consistent; and
    when the decoded test frame numbers are inconsistent, determining the under-test system causes the at least one test frames to disappear when outputting the played test video.

4. The video transmission delay measurement method as claimed in claim 3, wherein the method further comprises the following step:
  calculating a disappearing frame number of the disappeared at least one test frame, and outputting the disappearing frame number.

5. The video transmission delay measurement method as claimed in claim 2, wherein the central time encoded into the at least one test frame is encoded into each test pixel of the at least one test frame in the form of a byte;
  wherein the byte represents a pixel value of each test pixel of the at least one test frame in the form of 8 bits;
  wherein the pixel value represented by the byte is interpreted as a one-bit information, and more than two-thirds of the pixel values of the at least one test frame are interpreted as the same one-bit information.

6. The video transmission delay measurement method as claimed in claim 1, wherein the original test video includes at least one test frame, and each test frame includes a plurality of test pixels;
  wherein, the test pixels of each test frame are constructed by a plurality of pixel strips to construct each test frame, the pixel strips include a first output pixel strip first outputted by a processor of the video transmission delay measurement device, and the played test video received by the processor through the input port includes a first input pixel strip;
  wherein when outputting the first output pixel strip of the original test video through the output port, the measurement method further includes the following steps:
    measuring a sending time of the original test video;
  wherein when receiving the played test video through the input port, the measurement method further includes the following steps:
    measuring a receiving time of the played test video; and
    calculating a time between the receiving time and the sending time as a vertical time difference and outputting the vertical time difference.

7. The video transmission delay measurement method as claimed in claim 6, wherein after calculating the time difference, the measurement method further includes the following step:
  adding the vertical time difference and the time difference to obtain a total delay time and outputting the total delay time.

8. The video transmission delay measurement method as claimed in claim 1, wherein the original test video outputted to the under-test system contains a stress testing image, and the original test video performs a stress test through the stress testing image to determine whether the under-test system delays processing the original test video into the played test video.

9. A video transmission delay measurement device, testing an under-test system having an under-test system input port and an under-test system output port and comprising:
  a shell;
  a monitor, arranged on the shell;
  an output port, arranged on the shell and electrically connected to the under-test system input port of the under-test system;
  an input port, arranged on the shell and electrically connected to the under-test system output port of the under-test system; and
  a processor, electrically connected to the monitor, the output port, and the input port, and executing:
    generating an original test video and outputting the original test video to the under-test system input port of the under-test system; wherein the original test video has a central time corresponding to a video generating time at which the original test video is generated;
    receiving a played test video from the under-test system output port of the under-test system; wherein the played test video has the central time corresponding to the video generating time at which the original test video is generated;
    obtaining the central time of the played test video; and calculating a time difference between a current time and the central time of the under-test system.

\* \* \* \* \*